United States Patent
Ramkumar et al.

(10) Patent No.: US 12,386,923 B1
(45) Date of Patent: Aug. 12, 2025

(54) MANAGED ACTIVATION OF LICENSED SOFTWARE FOR RESOURCES IN PEERED NETWORKS

(71) Applicant: Amazon Technologies, Inc., Seattle, WA (US)

(72) Inventors: Srinivasan Ramkumar, San Jose, CA (US); Rajesh Yarlagadda, San Jose, CA (US); Ramapulla Reddy Chennuru, Milpitas, CA (US); Raviprasad V Mummidi, Mountain View, CA (US); Juveria Kanodia, Saratoga, CA (US); Ramu Panayappan, Sunnyvale, CA (US); Rajesh Gopidi, Alpharetta, GA (US); Cai Liu, Redwood City, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 169 days.

(21) Appl. No.: 18/201,373

(22) Filed: May 24, 2023

(51) Int. Cl.
   *G06F 21/10* (2013.01)
   *H04L 9/40* (2022.01)

(52) U.S. Cl.
   CPC ........ *G06F 21/105* (2013.01); *H04L 63/0272* (2013.01); *H04L 63/102* (2013.01); *G06F 21/1075* (2023.08)

(58) Field of Classification Search
   CPC ............... G06F 21/105; G06F 21/1075; H04L 63/0272; H04L 63/102
   See application file for complete search history.

(56) References Cited

U.S. PATENT DOCUMENTS

| | | | |
|---|---|---|---|
| 8,363,658 B1* | 1/2013 | Delker | H04L 41/0895 370/252 |
| 11,240,203 B1* | 2/2022 | Eyada | H04L 63/20 |
| 2013/0239232 A1* | 9/2013 | Yoakum | G06F 21/121 726/29 |

(Continued)

FOREIGN PATENT DOCUMENTS

| | | | | |
|---|---|---|---|---|
| AU | 2006275655 B2 * | 2/2007 | | G06F 21/105 |
| CN | 106534084 A * | 3/2017 | | G06F 21/105 |

(Continued)

*Primary Examiner* — Sarah Su
(74) *Attorney, Agent, or Firm* — Perilla Knox & Hildebrandt LLP; Thomas B. Hildebrandt

(57) ABSTRACT

Techniques for a license manager service of a cloud system to activate and run licensed applications in VPCs with peering connections (or "peered VPCs") established with configured VPCs. The license manager service may provide users with the ability to select a particular VPC to be configured to use licensed applications, and may further allow users to enable peered VPCs of the configured VPC to use licensed applications. The license manager service may provide a managed experience for activating the licenses for the applications running on computing resources in the configured VPCs and peered VPCs. The license manager service may launch licensed applications on virtual resources in a user's configured VPC and peered VPCs, manage the process for activating the licensed applications with third-party providers, and provide the user with access to licensed applications that have been activated and configured by the license manager service in configured and peered VPCs.

20 Claims, 12 Drawing Sheets

(56) References Cited

U.S. PATENT DOCUMENTS

2018/0375815 A1* 12/2018 Dinardo, Sr. ......... H04W 4/025
2020/0344229 A1* 10/2020 Srivastava ............ G06F 21/105
2023/0125189 A1*  4/2023 Chang ..................... H04L 63/12
                                                         726/26

FOREIGN PATENT DOCUMENTS

| CN |    109255208 A  * |  1/2019 | ........... G06F 21/105 |
| EP |      4446912 A1 * | 10/2024 | ......... G06F 21/1014 |
| WO | WO-2008115647 A1 * |  9/2008 | ........... G06F 21/105 |
| WO | WO-2015087444 A1 * |  6/2015 | ............. G06F 21/10 |
| WO | WO-2023069392 A1 * |  4/2023 | ............. H04L 12/46 |
| WO | WO-2024238543 A1 * | 11/2024 | |

* cited by examiner

200

LICENSE MANAGER ENROLLMENT
Enroll for license manager to provide you with a managed experience for managing licenses used by your resources

202 — Enable License Manager

Create a service-linked role for managing subscriptions -
Do you give License Manager permission to create a service-linked role in your account to manage licenses used by resources?

☑ I agree to give License Manager permission to create a service-linked role in my account

204 — Configure Directory Service

Managed Directory Service
206 — Choose the directory service and products you want to have managed
Directory name and ID

208 — [ dirsvc.cloud ▼ ]

Product names and IDs

210 — [ Choose products ▼ ]

Virtual Private Clouds
Choose a VPC for additional configuration to enable License Manager

[ 🔍 Filter VPCs ]

| VPC ID | Status |
|---|---|
| ● VPC-e29b343 | ⊖ Unconfigured |
| ○ VPC-e31d232 | ⊖ Unconfigured |

212

214 — ☑ Would you like to activate licenses for applications running in peered VPCs of your configured VPC?

216 — Subnets for VPC-e29b343
Select a subnet in which to configure a VPC endpoint

[ 🔍 Filter subnets ]

218 — Security groups for VPC-e29b343
Select a security group that allows traffic inbound to the VPC endpoint

[ 🔍 Filter subnets ]

[ Cancel ]  [ Configure ]

FIG. 2

MANAGED ACTIVATION OF LICENSED SOFTWARE FOR RESOURCES IN PEERED NETWORKS

BACKGROUND

Cloud providers offer cloud-based services to fulfill users' computing-service needs without the users having to invest in and maintain computing infrastructure required to implement their services. These cloud providers maintain networks of managed computing resources and functionality to implement various types of scalable, on-demand services, to support applications of the users. Specifically, the cloud providers may maintain networks of data centers, which in turn may include a number of interconnected computing devices (or "servers"), that provide computing resources to support applications of the users. Users may be provided with logically isolated portions of the cloud provider network, often referred to as virtual networks (VNets) or virtual private clouds (VPCs), in which they can launch resources to support their applications. Users of cloud systems can launch and run various types of applications on scalable resources in their VPCs, such as their own proprietary applications, cloud-native applications provided by the cloud provider, and third-party applications provided by third-party developers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates an example user interface through which a user enrolls for use of a license manager service.

DETAILED DESCRIPTION

Figure 1:
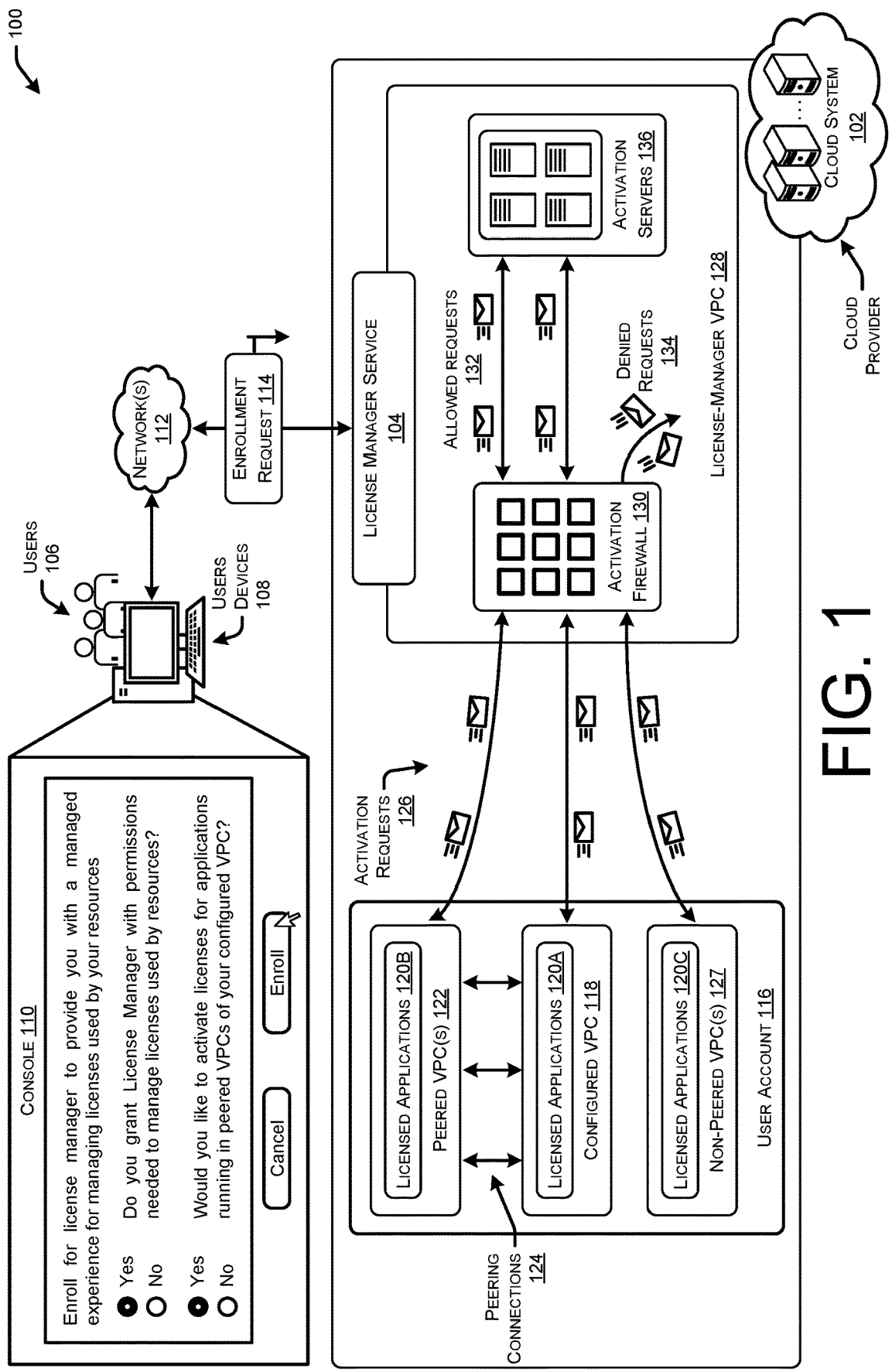
FIG. 1 illustrates a system-architecture diagram of an example environment in which an activation firewall of a license manager service allows activation requests from licensed applications in peered VPCs to be sent to activation servers.

This disclosure describes techniques for a license manager service of a cloud system to activate and run licensed applications in VPCs that have peering connections (or "peered VPCs") established with configured VPCs of the users. Manually tracking the usage of software licenses for licensed applications can be cumbersome and error-prone. Further, the process of activating the licenses for third-party applications (e.g., applications developed by entities other than the cloud provider and the users) may be difficult or impossible depending on the activation protocols and procedures put in place by the application providers. The license manager service may provide users with the ability to select a particular VPC to be configured to use licensed applications, and may further allow users to enable peered VPCs of the configured VPC to use licensed applications. The license manager service may provide a managed experience for activating the licenses for the applications running on computing resources in the configured VPCs and peered VPCs. The license manager service may launch licensed applications on virtual resources in a user's configured VPC and peered VPCs, manage the process for activating the licensed applications with third-party providers, and provide the user with access to licensed applications that have been activated and configured by the license manager service in configured and peered VPCs.

Because VPC constructs provide isolation and security to users by preventing others from accessing their VPCs, the users generally have to personally manage various aspects around the resources and applications in their VPCs. However, with such a wide variety of applications running in the cloud system, it can take a great deal of time and expertise for users to launch, configure, and manage applications running in their VPCs. According to the techniques described herein, users may enroll for more managed and automated experiences than those traditionally provided by managed services, such as license manager. For example, users may request that license manager service perform different types of automated or semi-automated functions such as launching, configuring, licensing, and activating licenses for various licensed applications for computing resources (e.g., servers, VMs, containers, etc.) in configured and peered VPCs. To opt in for the functionality provided by the license manager, users may define or provide a set of permissions, or roles, that the license manager service may assume while in the user account. The permissions define types of management operations that the license manager service is permitted to take, and/or not permitted to take, as the license manager service provides various automated management experiences. In some instances, the set of permissions created for the license manager service may be referred to as a "service-linked role" that the managed service may assume when performing management operations in the user account.

After the set of permissions are in the user account, the license manager service may request that the user designate a VPC to be configured for the licensed applications to be launched into, and to communicate with activation servers. Generally, the cloud system may include one or more activation servers that perform techniques for activating licenses of the licensed applications. The VPC that is selected for configuration will include at least one sub network (also referred to herein as "subnet") in which an endpoint (or "gateway") is provisioned that is configured to create a private connection with the activation servers over which activation requests are sent to activate the licensed applications. The license manager service may configure the selected VPC by launching a VPC endpoint into a subnet of the VPC to establish the private connection with the activation server(s), applying security groups or policies that allow communications with the activation servers, and configuring a directory service in the VPC that manages permissions and credentials for activating the licensed applications. In some examples, virtual computing resources on which licensed applications are launched in the configured VPC may be allowed to activate the licensed applications.

The user account may have additional VPCs in which computing resources are hosted, and some of those VPCs may have peering connections with the configured VPC. Generally, VPCs are overlay networks that are logically isolated from other overlay networks in the cloud system in which computing resources are launched. A VPC peering connection is a networking connection between two VPCs that enables traffic to be routed between the VPCs using private IP addresses (e.g., IPv4 and/or IPv6 addresses). Computing resources in peered VPCs can communicate with each other over the peering connections as if they are within the same virtual network. The VPC peering connections can be created between VPCs registered to a single user account, or between VPCs in different user accounts, and the VPCs can be in different regions (also known as an inter-region VPC peering connection).

According to the techniques described herein, the user account may further specify that the license manager service is to activate licensed applications that are launched in peered VPCs of the configured VPC. The peered VPCs may communicate the activation requests from the licensed applications running in the peered VPCs over the peered connection to the configured VPC, and the activation requests may then be forwarded to an activation server over the private connection between the configured VPC and the activation server.

As an example, the user account may request that the license manager, or another service of the cloud system, provision a new instance of a licensed application in a peered VPC of the configured VPC. The license manager service may launch a virtual resource (e.g., VM, container, etc.), or detect a launch of a virtual resource, on which the licensed application is installed. The license manager service may configure the licensed application to send activation requests to an activation firewall that is configured to allow or deny activation requests destined to the activation server. For instance, the licensed application may be configured to send activation requests to a private Domain Name System (DNS) name that is assigned to the activation firewall, and/or a load balancer that distributes activation requests to the activation firewall. To trigger the activation process, the license manager service may send a command to the licensed application to send the activation request to the activation firewall and begin the activation process. The licensed application running in the peered VPC may send the activation request over the peering connection to the configured VPC, and the activation request may then be forwarded to the activation firewall over the private connection.

The activation firewall may be used to ensure that licensed applications are only activated if activation of the licensed applications are permitted by the license manager. In this way, the license manager service may track usage of all licensed applications and determine metrics indicating the usage of the licensed applications for compliance reasons. For instance, there may be agreements in place regarding usage, such as payment or permitted use agreements, that indicate amounts of usage of licensed applications that are permitted, or costs for running licensed applications (e.g., cost per instance of a licensed application, cost for how long a licensed application is used, etc.).

To ensure that users are unable to provision and activate license instances that are not tracked by the license manager, the activation firewall may filter activation requests received from virtual computing resources. Following the above example, the activation firewall may receive the activation request sent from the application on the virtual computing resource and determine the source of the activation request. For instance, the activation firewall (and/or load balancer) may extract metadata from the activation request indicating that the virtual computing resource is a source of the activation request. The metadata may include a private Internet Protocol (IP) address associated with virtual computing resource, a VPC ID of a VPC in which the virtual computing resource is provisioned, and an account identifier (ID) of the user account. The activation firewall may send at least a tuple including the VPC ID of the peered VPC and the private IP address (and potentially the user account ID) of the virtual computing resource to the license manager service and/or a compute-management system to verify that the virtual computing resource is in a peered VPC to the configured VPC of the user account.

The activation firewall may be configured to drop, block, or otherwise refrain from sending activation requests to the activation server(s) upon determining that the activation requests were received from virtual computing resources and/or applications that are not running in the configured or peered VPCs. Conversely, the activation firewall may forward activation requests to the activation server upon determining that the activation requests were received from virtual computing resources and/or applications that are running in the configured or peered VPCs. In this way, only licensed applications managed by the license manager service and launched in the configured or peered VPCs may be activated by activation servers.

In some instances, there may be different activation servers configured to activate different licensed applications. The activation firewall may determine a unique product code for the licensed applications. The activation firewall may store mappings between private DNS names for activation servers and unique product codes, and forward activation requests to the private DNS names that are mapped to the requests' unique product codes. In some instances, the activation firewall and activation servers may be in a service VPC of the cloud system. In other instances, however, the activation servers may be at a remote location outside of the cloud system.

The activation firewall may help establish and maintain a connection open between the virtual computing resource and the activation server to allow for activation of the application using an activation protocol. The connection may be a stateful Transport Control Protocol (TCP) connection that is used to communicate data for the activation protocol. In this way, a license manager service may automate the process for provisioning and activating licensed applications for use by users of a cloud system.

In some examples, the cloud system may offer customer accounts that allow organizational users (e.g., enterprises, companies, customers, groups of users, etc.) to create user accounts that are managed by administrators of the customer account. For instance, companies may register for one or more customer accounts under which individual user accounts are created for employees of the companies. The customer accounts allow for administrators of those accounts to allocate resources, group accounts, and apply governance policies to accounts or groups.

In addition to provisioning and activating licensed applications, the license manager service may additionally assign user accounts of the customer account to have access to applications (licensed and unlicensed applications). To provide user accounts with access to licensed applications, the customer account may onboard a directory service with the manager service. For instance, an administrator of the customer account may provide the manager service with a directory ID of the customer account, and the manager service may locate and onboard the directory service using the directory ID. The administrator may provide input indicate what user account(s) in the customer account are to be provided access to use the licensed application. The license manager service may then, using the set of permissions, update the directory service to indicate the user account(s) that are permitted to access the application running in the customer account of the particular type. In this way, the applications running on virtual resources are usable by the assigned user accounts when the accounts present credentials (e.g., username and password, bio authenticator, etc.).

The techniques described herein solve problems rooted in cloud computing technology using solutions rooted in technology. Further, the techniques described herein improve the functioning of cloud systems. As an example, the process of activating licenses for third-party applications may be difficult or impossible depending on the protocols used and/or restrictions placed by the third-party developers. The techniques described herein enable the activation of these licensed applications such that cloud systems can support and run a greater variety of applications, thereby improving the functioning of the cloud system. Further, various cross-account management operations have traditionally been disallowed or were not previously possible. The techniques described herein enable additional cross-account management operations, which allows for cloud systems to offer managed services that can provide additional managed experiences for users.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 that includes a cloud system 102 in which a license manager service 104 allows activation requests from licensed applications in peered VPCs to be sent to activation servers.

The cloud system 102 may be operated and/or managed by a cloud or service provider and may provide various services to users to fulfil their computing resource needs, such as cloud-based computing resources. For instance, users 106 may operate user devices 108 in order to register for use of the computing resources of the cloud system 102. The cloud system 102 may include a one or more managed services that include components to provide different types of automated, or semi-automated, services for users, such as a license manager service 104. Generally, the license manager service 104 may be, at least partly, control-plane systems that control operations occurring in the cloud system 102. The license manager service 104 may be either centralized, or distributed, and be supported by one or more computing devices.

The license manager service 104 may integrate with other cloud services to simplify the management of licenses for software across user accounts, IT catalogs, and on-premises, through a single user account. The license manager service 104 lets users 106 (e.g., administrators) create customized licensing rules that emulate the terms of their licensing agreements, and then enforces these rules when a computing resource (e.g., server, virtual machine, container, etc.) gets launched. The rules in the license manager service 104 enable users 106 to limit a licensing breach by physically stopping the instance from launching or by notifying administrators about the infringement.

As illustrated, a cloud system 102 may be operated and/or managed by a cloud provider. The cloud system 102 may provide various services to users to fulfil their computing resource needs, such as cloud-based computing resources. For example, the cloud system 102 may provide cloud-based, scalable, and network accessible compute power services, storage services, database services, and/or other services. Users 106 may utilize user devices 108 to subscribe for use of the computing resources and/or services provided by the cloud system 102.

A cloud system 102, often referred to as a cloud provider network or simply as a "cloud," refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud system 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users 106 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud system 102 may deliver content from points of presence outside of, but networked with, these regions by way of edge locations and regional edge cache servers. This compartmentalization and geographic distribution of computing hardware enables the cloud system 102 to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud system 102 may provide on-demand, scalable computing services to users 106 through a network, for example allowing users 106 to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 106, the hardware associated with the virtual computing devices can be scaled up or down depending upon the resources the user 106 requires. Users 106 can choose to deploy their virtual computing systems to provide network-based services for their own use and/or for use by their users or client.

The cloud system 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 106 of the cloud system 102, which may be provisioned in user accounts.

The cloud system 102 may offer many different built-in services to the users 106 to help run their applications and services. For instance, the cloud system 102 may provide users 106 with use of VPCs, which are logically isolated sections of the cloud system 102 that serve as private virtual environments to which only permitted users 106 have access to use. Users 106 may have multiple VPCs, potentially spanning across different regions of the cloud system 102. To help interconnect VPCs and other resources of the user's computing infrastructure, the service provider may also offer many different built-in networking services. The VPCs may be used by the users 106 to create subnetworks, configure personalized route tables, choose IP addresses, monitor connections, screen network traffic, restrict access into the VPCs, and/or for other operations. As shown. The VPCs include or run computing resources, such as servers, virtual machines (VMs), containers, serverless functions, workloads, processes, etc. Generally, the computing resources are used to support or run applications or services of the users 106.

A virtual private cloud (VPC) (also referred to as a virtual network (VNet), virtual private network, or virtual cloud network, in various implementations) is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC, security groups), and transit paths.

A VPC is a virtual network dedicated to a particular customer account (or set of related customer accounts, such as different customer accounts belonging to the same business organization). A VPC is logically isolated from other virtual networks in the cloud. Customers can launch resources, such as compute instances, into a VPC. When creating a VPC, a customer can specify a range of IPv4 addresses for the VPC in the form of a Classless Inter-Domain Routing (CIDR) block. A VPC can span all of the availability zones in a particular region. After creating a VPC, a customer can add one or more subnets in each availability zone or edge location.

Users 106 may desire that the license manager service 104 provision licensed applications 120 and activate the licensed applications 120 with first-party and/or third-party providers of the software. The users 106 (e.g., network administrators, organization employees, etc.) may interact with the cloud system 102, via their user account and/or one or more user portals or consoles 110 (e.g., web console, command line interface (CLI), application programming interface (API), etc.). The license manager service 104 may request permission from the user to manage the licenses used by resources in the VPCs of the user 106 via the console 110. Further, the license manager service 104 may request that the user 106 specify whether the user 106 would like to activate licenses for applications running in peered VPCs of the configured VPC. The user 106 may provide answers to these questions, potentially along with other information used by the license manager service 104, and submit an enrollment request 114 to the license manager service 104 over one or more networks 112. In this way, users 106 may request that license manager service 104 perform different types of automated or semi-automated services such as launching, configuring, licensing, and activating licenses for various licensed applications 120 for computing resources (e.g., servers, VMs, containers, etc.) in configured and peered VPCs.

To opt in for various services provided by the license manager service 104, users 106 may define or provide a set of permissions, or roles, that the license manager service 104 may assume while in the user account 116. The permissions define types of management operations that the license manager service 104 is permitted to take, and/or not permitted to take, as the license manager service 104 provides various automated management experiences. In some instances, the set of permissions created for the license manager service 104 may be referred to as a "service-linked role" that the license manager service 104 may assume when performing management operations in the user account 116.

After the set of permissions are in the user account 116, the license manager service 104 may request that the user 106 designate a configured VPC 118 to be configured for the licensed applications 120 to be launched into, and to communicate with activation servers 136. Generally, the cloud system 102 may include one or more activation servers 136 that perform techniques for activating licenses of the licensed applications 120. The configured VPC 118 that is selected for configuration will include at least one subnet in which an endpoint (or "gateway") is provisioned that is configured to create a private connection with the activation servers 136 over which activation requests 126 are sent to activate the licensed applications 120. The license manager service 104 may configure the configured VPC 118 by launching a VPC endpoint into a subnet of the VPC to establish the private connection with the activation servers 136, applying security groups or policies that allow communications with the activation servers 136, and configuring a directory service in the configured VPC 118 that manages permissions and credentials for activating the licensed applications 120. In some examples, computing resources (e.g., servers, virtual machines, containers, etc.) on which licensed applications 120 are launched in the configured VPC 118 may be allowed to activate the licensed applications 120.

The user account 116 may have additional VPCs in which computing resources are hosted, and some of those VPCs 122 may have peering connections with the configured VPC. As noted above, VPCs are virtual networks that are logically isolated from other virtual networks in the cloud system 102 in which computing resources are launched. A VPC peering connection 124 is a networking connection between two VPCs that enables traffic to be routed between the VPCs using private IP addresses (e.g., IPv4 and/or IPv6 addresses). Computing resources in peered VPCs 122 can communicate with each other over the peering connections 124 as if they are within the same virtual network. The VPC peering connections 124 can be created between VPCs registered to a single user account 116, or between VPCs in different user accounts 116, and the VPCs can be in different regions (also known as an inter-region VPC peering connection 124).

As shown in console 110, the user 106 may specify that the license manager service 104 is to activate licensed applications 120B that are launched in peered VPCs 122 of the configured VPC 118. The peered VPCs 122 may communicate the activation requests 126 from the licensed applications 120B running in the peered VPCs 122 over the peered connection to the configured VPC 118, and the activation requests 126 may then be forwarded towards an activation server 136 over the private connection between the configured VPC 118 and the activation server 136.

As an example, the user account 116 may request that the license manager service 104, or another service of the cloud system 102, provision a new instance of a licensed application 120B in a peered VPC 122 of the configured VPC 118. The license manager service 104 may launch a virtual resource (e.g., VM, container, etc.), or detect a launch of a virtual resource, on which the licensed application 120B is installed. The license manager service 104 may configure the licensed application 120B to send activation requests to an activation firewall 130 that is configured to allow or deny activation requests 126 destined to the activation server 136. For instance, the licensed application 120B may be configured to send activation requests 126 to a private DNS name that is assigned to the activation firewall 130, and/or a load balancer that distributes activation requests to the activation firewall 130. To trigger the activation process, the license manager service 104 may send a command to the licensed application 120B to send the activation request 126 to the activation firewall 130 and begin the activation process. The licensed application 120B running in the peered VPC 122 may send the activation request 126 over the peering connection 124 to the configured VPC 118, and the activation request 126 may then be forwarded to the activation firewall 130 over the private connection.

The activation firewall 130 may be used to ensure that licensed applications 120 are only activated if activation of the licensed applications 120 are permitted by the license manager service 104. In this way, the license manager service 104 may track usage of all licensed applications 120 and determine metrics indicating the usage of the licensed applications 120 for compliance reasons. For instance, there may be agreements in place regarding usage, such as payment or permitted use agreements, that indicate amounts of usage of licensed applications 120 that are permitted, or costs for running licensed applications 120 (e.g., cost per instance of a licensed application 120, cost for how long a licensed application 120 is used, etc.).

To ensure that users 106 are unable to provision and activate license instances that are not tracked by the license manager service 104, the activation firewall 130 may filter activation requests 126 received from virtual computing resources. Following the above example, the activation firewall 130 may receive the activation request 126 sent from the application 120B on the virtual computing resource and determine the source of the activation request 126. For instance, the activation firewall 130 (and/or load balancer) may extract metadata from the activation request 126 indicating that the virtual computing resource is a source of the activation request. The metadata may include a private IP address associated with virtual computing resource, a VPC ID of a VPC in which the virtual computing resource is provisioned, and an account identifier (ID) of the user account. The activation firewall 130 may send at least a tuple including the VPC ID of the peered VPC 122 and the private IP address (and potentially the user account ID) of the virtual computing resource to the license manager service 104 and/or a compute-management system to verify that the virtual computing resource is in a peered VPC 122 to the configured VPC 118 of the user account 116.

The activation firewall 130 may be configured to drop, block, or otherwise refrain from sending activation requests 126 to the activation servers 136 upon determining that the activation requests 126 were received from virtual computing resources and/or applications that are running in non-peered VPCs 127 (e.g., denied requests 134). Conversely, the activation firewall 130 may forward activation requests 126 to the activation server 136 upon determining that the activation requests 126 were received from virtual computing resources and/or applications 120 that are running in the configured VPC 118 or peered VPC 122 (e.g., allowed requests 132). In this way, only licensed applications 120 managed by the license manager service 104 and launched in the configured VPC 118 or peered VPC 122 may be activated by activation servers 136.

In some instances, there may be different activation servers 136 configured to activate different licensed applications 120. The activation firewall 130 may determine a unique product code for the licensed applications 120 and store mappings between private DNS names for activation servers 136 and unique product codes, and forward activation requests 126 to the private DNS names that are mapped to the requests' unique product codes. In some instances, the activation firewall 130 and activation servers 136 may be in a license manager VPC 128 of the cloud system 102. In other instances, however, the activation servers 136 may be at a remote location outside of the cloud system 102.

The activation firewall 130 may help establish and maintain a connection open between the virtual computing resource and the activation server 136 to allow for activation of the application 120B using an activation protocol. The connection may be a stateful Transport Control Protocol (TCP) connection that is used to communicate data for the activation protocol. In this way, the license manager service 104 may automate the process for provisioning and activating licensed applications 120 for use by users 106 of a cloud system 102.

In some examples, the cloud system 102 may offer customer accounts that allow organizational users (e.g., enterprises, companies, groups of users, etc.) to create user accounts that are managed by administrators of the customer account. For instance, companies may register for one or more customer accounts under which individual user accounts are created for employees of the companies. The customer accounts allow for administrators of those accounts to allocate resources, group accounts, and apply governance policies to accounts or groups.

In addition to provisioning and activating licensed applications, the license manager service 104 may additionally assign user accounts of the customer account to have access to applications (licensed and unlicensed applications). To provide user accounts with access to licensed applications, the customer account may onboard a directory service with the license manager service 104. For instance, an administrator of the customer account may provide the license manager service 104 with a directory ID of the customer account, and the manager service may locate and onboard the directory service using the directory ID. The administrator may provide input indicate what user account(s) in the customer account are to be provided access to use the licensed application 120. The license manager service 104 may then, using the set of permissions, update the directory service to indicate the user account(s) 116 that are permitted to access the application 120 running in the customer account of the particular type. In this way, the applications 120 running on virtual resources are usable by the assigned user accounts 116 when the accounts present credentials (e.g., username and password, bio authenticator, etc.).

Thus, users 106 may have created user accounts 116 with the cloud system 102 to utilize the resources of the cloud system 102. The users 106 may utilize their devices 108 to communicate over one or more networks 112 (e.g., WANs, PANs, LANs, etc.) with the cloud system 102. The user devices 108 may comprise any type of computing device configured to communicate over network(s) 112, such as mobile phones, tablets, laptop computers, desktop computers, televisions, servers, and/or any other type of computing device. The users 106 (e.g., network administrators, organization employees, etc.) may interact with the cloud system 102, via their user account and/or one or more user portals or consoles 110 (e.g., web console, command line interface (CLI), application programming interface (API), etc.).

Generally, the license manager service 104, and components thereof, may comprise software, firmware, and/or other logic that is supported one computing device, or across more computing devices in the cloud system 102. Additionally, the license manager service 104 may comprise a system of other devices. The techniques described herein are generally described with respect to a service provider network, such as a cloud provider network or system. However, the techniques are generally applicable for any network, such as on-premises networks, hybrid networks, and so forth.

FIG. 2 illustrates an example user interface 200 through which a user 106 enrolls for use of a license manager service 104. The user interface 200 provides various options for the user 106 to populate in order to enroll for license manager service 104 to provide the user 106 with a managed experience for managing licenses used by resources.

A service-linked-role (SLR) field 202 includes a request for the user 106 to grant the license manager service 104 with the ability to create a set of permissions, or an SLR, in their user account 116 to perform various operations (e.g., calling various APIs) for managing the licenses used by resources. The user 106 may select an option in the SLR field 202 to grant the license manager service 104 permission, and the license manager service 104 may create the SLR in the user account 116.

A managed directory service field 204 may prompt the user 106 to select which directory service and products they would like to have managed. The user 106 may interact with a directory name and ID field 206 to select a particular directory service, and may also interact with a product field 208 to select product names and IDs for the products they would like to have managed by the license manager service 104 and directory service.

A VPC field 210 may prompt the user to choose a configured VPC 118 that is to receive additional configuration to enable the license manager service 104. The user 106 may be able to filter or search all their VPCs and select a particular VPC to be the configured VPC 118 to enable the license manager service 104 (e.g., launching a VPC endpoint into a subnet of the VPC to establish the private connection with the activation servers 136, applying security groups or policies that allow communications with the activation servers 136, and configuring a directory service in the VPC 118 that manages permissions and credentials for activating the licensed applications 120).

Additionally, the user interface 200 may include a peering option 214 that is selectable by the user 106 to enable the license manager service 104 to activate licenses for applications 120 running in peered VPCs 122 of the configured VPC 118.

The user interface 200 may also include a subnets field 216 that allows the user 106 to select a subnet of the configured VPC 118 in which to launch a VPC endpoint used to establish the private connection. Further, the user interface 200 may include a security groups 218 field (e.g., firewall policy groupings) through which the user 106 may select one or more security groups that allow traffic inbound to the VPC endpoint that is in the subnet of the configured VPC 118.

Once the user 106 has finished providing information needed to enroll for use of the license manager service 104, the user 106 may select a configure option that causes the license manager service 104 to begin performing operations for automating the activation of licensed applications 120 in the configured VPC 118 and peered VPC 122.

Figure 3:
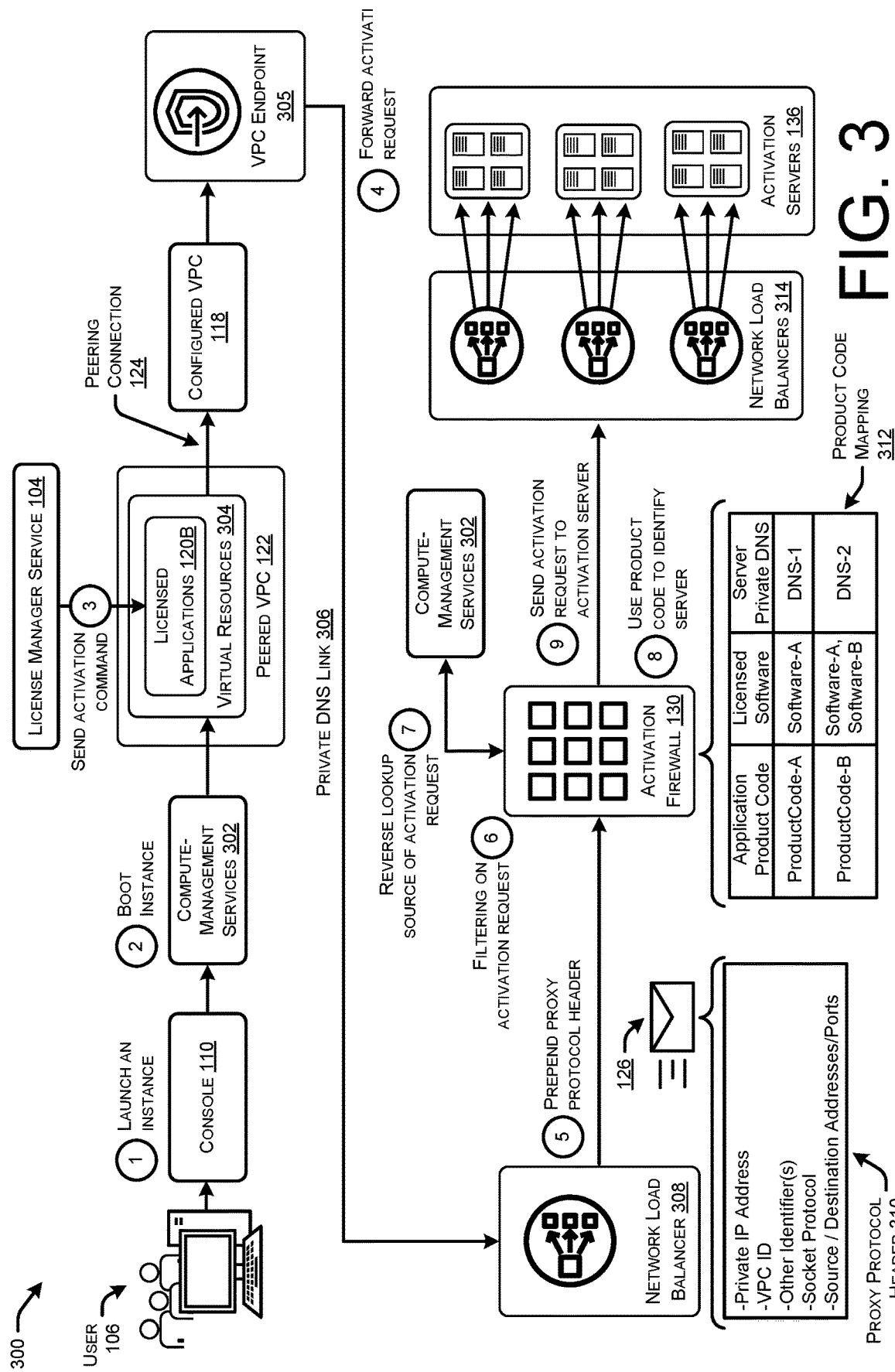
FIG. 3 illustrates a flow diagram in which a license manager service and components of a cloud system activate a licensed application running in a peered VPC for use by a user account.

FIG. 3 illustrates a flow diagram 300 in which a license manager service 104 and components of a cloud system 102 activates a licensed application running in a peered VPC 122 for use by a user account 116.

At 1, the user 106 may access their console 110 and launch an instance. The request to launch an instance may be sent to the compute-management service 202, and at 2, the compute-management service 302 may boot the instance. For instance, the compute-management service 202 may allocate a launched and running instance for use by the particular user account and boot the instance in the user account. At 3, the license manager service 104 may send an activation command that causes or triggers the licensed instance to send an activation request 126 (or the licensed instance is configured to send the activation request 126 on its own). At 4, a VPC endpoint 305 may forward the activation request 126 over a private DNS link 306 that is connected to a network load balancer 308 associated with the activation firewall 130. At 5, the network load balancer 308 may prepend a proxy protocol header 310 to the activation request 126 that includes information that the activation server 136 would have been able to get by itself if the client was connecting directly to the server 136 rather than via a proxy. The information carried by the protocol may be the ones the activation server 136 would get using getsockname( ) and getpeername( ), such as the address family (AF_INET for IPv4, AF_INET6 for IPv6, AF_UNIX), the socket protocol (SOCK_STREAM for TCP, SOCK_DGRAM for UDP), layer 3 source and destination addresses, and/or layer 4 source and destination ports if any.

At 6, the network load balancer 308 may send the activation request 126 to the activation firewall 130, and the activation firewall 130 may perform filtering on the activation request 126, such as by applying one or more filtering rules. For instance, the activation firewall 130 may determine if the activation request 126 was sent from an application 120 running in a configured VPC 118, and if not, determine if the activation request 126 was sent from an application 120 running in a peered VPC 122. The activation firewall 130 may drop activation requests 126 that are not sent from a peered VPC 122 or configured VPC 118. Additionally, or alternatively, the activation firewall 130 may determine if the activation request 126 was sent from an IP address on a "disallowed list" or an "allowed list" and allow or disallow the activation request 126 based on the IP address being on disallowed or allowed lists.

At 7, the activation firewall 130 may perform a reverse lookup at 6 for the source of the activation request 126. Generally, the activation firewall 130 may scan all proxy protocol headers 310 sent over the network load balancer 308 in order to reverse-lookup the request's origination data. The data in the header 310 may include account ID, IP address, and VPC ID for the source of the activation request 126. The activation firewall 130 may call a describe-instances API to fetch a product code associated with the originating instance 120 to verify that it is running in the peered VPC 122. Once the activation firewall 130 validates request's 126 origin as being authorized (e.g., from an instance managed by the license manager service 104), the activation firewall 130 may identify a server 136 to which the activation request 126 is to be forwarded. The activation firewall may, at 8, use a product code mapping 312 to identify an activation server 136 for the activation request 126. The product code may be mapped to a private DNS of an activation server 136, and the activation firewall 130 may, at 9, send the activation request 126 to the identified activation server 136 via network load balances 314.

Figure 4:
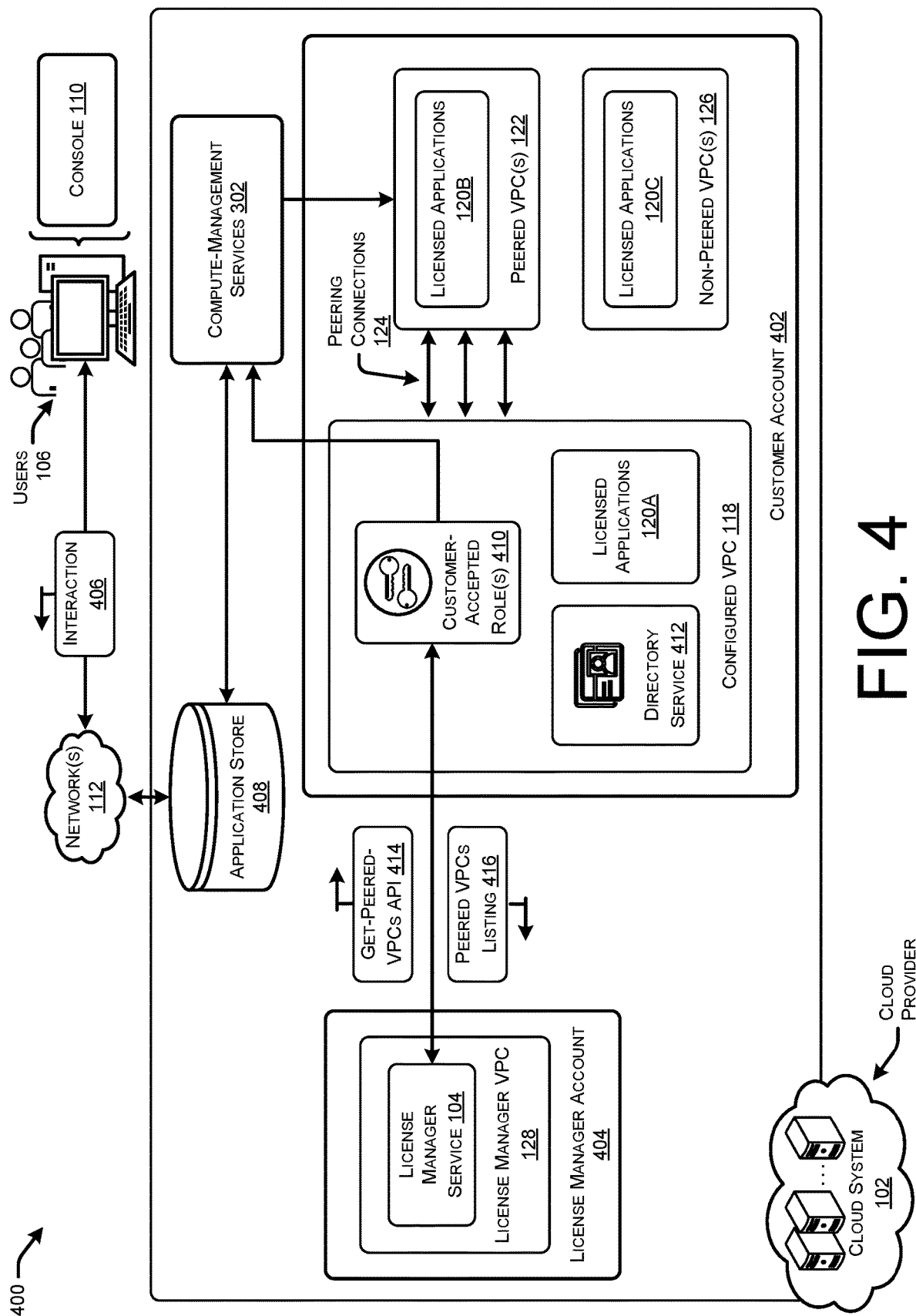
FIG. 4 illustrates a system-architecture diagram of an example environment in which a license manager service uses roles in a user account to determine a listing of peered VPCs for a configured VPC in the user account.

FIG. 4 illustrates a system-architecture diagram of an example environment 400 in which a license manager service 104 uses roles in a user account 116 to determine a listing of peered VPCs for a configured VPC in the user account.

As shown, a customer account 402 (which may include multiple user accounts belonging to the customer) may include a configured VPC 118, at least one peered VPC 122, and at least one non-peered VPC 126. Further, a license manager account 404, which is provided to the license manager service 104, may include or run a license manager VPC 128. The license manager service 104 may run in the license manager VPC 128 to perform various operations as described herein.

A user 106 may interact with a console 110 and send one or more interactions 406 over the network(s) 112, including a request to launch a licensed application 120 that is offered by an application store 408. Further, the interactions 406 may include user input indicating that one or more customer-accepted roles 410 are permitted to be placed in the configured VPC 118 to allow the license manager service 104 perform one or more permitted operations.

To provide user accounts with access to applications 120, the customer account 402 may onboard a directory service 412 defined in the configured VPC 118. For instance, an administrator of the customer account 402 may provide the license manager service 104 with a directory ID of the customer account 402, and the license manager service 104 may locate and onboard the directory service 412 using the directory ID. The administrator may provide input indicate what user account(s) in the customer account 402 are to be provided access to use the licensed applications 120. The license manager service 104 may then, using the role(s) 410, update the directory service 412 to indicate the user account (s) that are permitted to access the applications 120 running in the customer account 402 of the particular type. In this way, the applications 120 running on virtual resources are usable by the assigned user accounts when the accounts present credentials (e.g., username and password, bio authenticator, etc.). The directory service 412 may include various organizational units that map different entities to each other. In this example, "instances," such as application instances and/or virtual resources, are mapped to user accounts that are allowed or authorized to access the application instances or virtual resources.

The license manager service 104 may utilize the customer-accepted role(s) 410 in order to perform various operations for activating licensed applications 120. For instance, a licensed application 120 may send a request to the activation firewall 130 of the license manager service 104, and the license manager service 104 may use the role(s) 410 to call a get-peered-VPCs API 414. The get-peered-VPCs API 414 may return a peered-VPCs listing 416 for the activation firewall 130 to use to determine whether or not to activate the licensed application 120.

Figure 5:
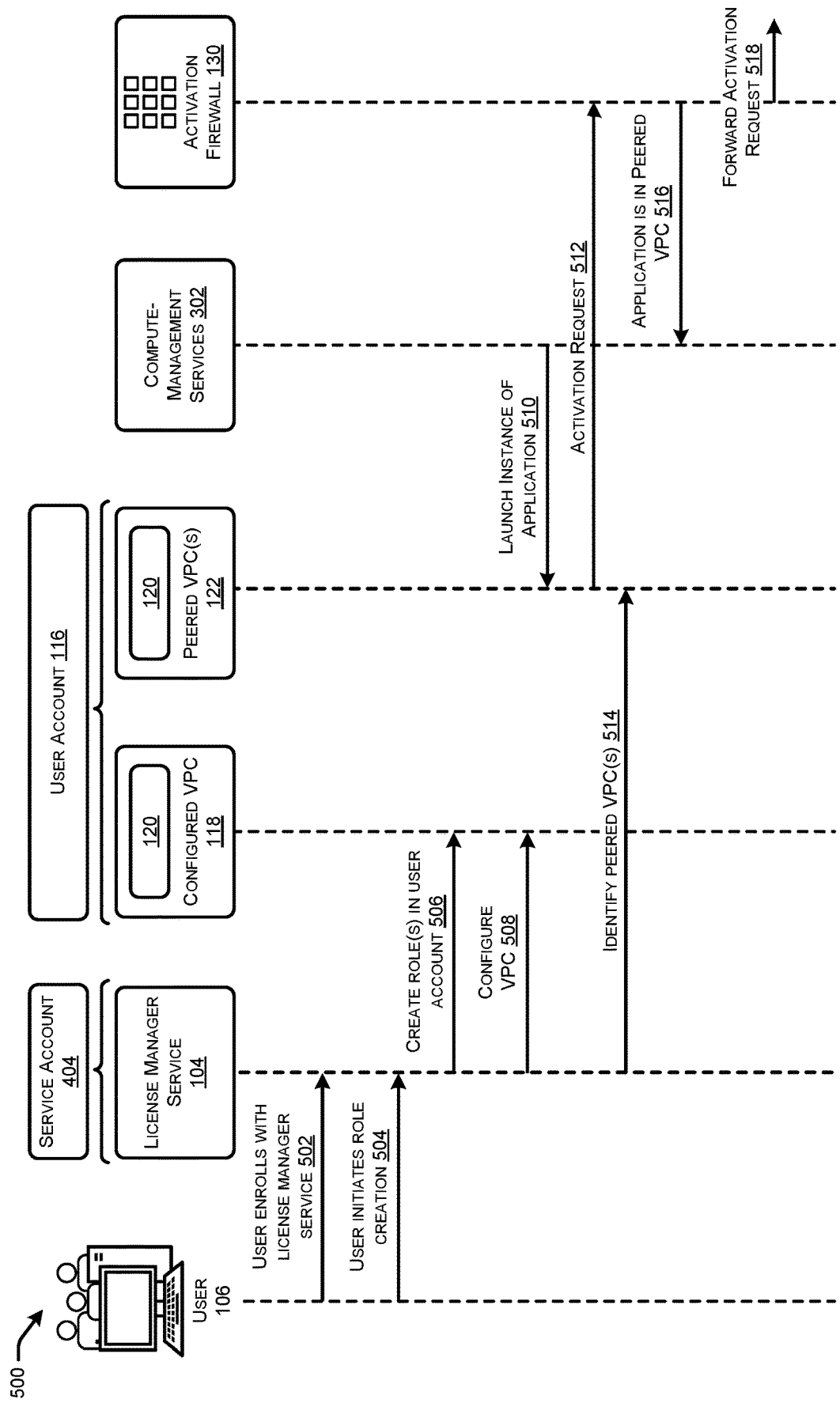
FIG. 5 illustrates a flow diagram of an example environment in which a license manager service activates a licensed application in a peered VPC of a configured VPC.

FIG. 5 illustrates a flow diagram 500 in which a license manager service 104 activates a licensed application 120 in a peered VPC 122 of a configured VPC 118.

At 502, a user 106 enrolls with the license manager service 104 to have the license manager service 104 automate the management of activation of licensed applications 120 that run in a user account 116 of the user 106. For instance, the user 106 may interact with a console 110 and send an enrollment request 114 to the license manager service 104.

At 504, the user 106 initiates a role creation with the license manager service 104 to create a role in the user account 116. For instance, the user 106 may interact with a service-linked role field 202 to allow the license manager service 104 to create a customer-accepted role 410 in the user account 116.

At 506, the license manager service 104 may create the customer-accepted role 410 in a configured VPC 118 of the user account 116 that enables the license manager service 104 to perform operations for managing the activation of licensed applications 120.

At 508, the license manager service 104 may configure the configured VPC 508 to enable the license manager service 104 to activate licensed applications 120 in the configured VPC 508, and also peered VPC(s) 122. The license manager service 104 may configure the configured VPC 118 by launching a VPC endpoint into a subnet of the VPC to establish the private connection with the activation servers 136, applying security groups or policies that allow communications with the activation servers 136, and configuring a directory service in the configured VPC 118 that manages permissions and credentials for activating the licensed applications 120.

At 510, the compute-management service 302 may launch an instance of a licensed application 120 on behalf of the user 106 in the peered VPC 122 (e.g., automated launch, launch for scaling, user-requested launch, etc.).

At 512, the licensed application 120 that was launched may send an activation request 126 to the activation firewall 130 in order to activate a license of the licensed application 120.

At 514, the activation firewall 130 may receive the activation request 126, and determine a source of the activation request 126. The activation firewall 130 may initially determine whether the licensed application 120 is in a configured VPC 118.

In response to determining that the licensed application 120 that send the activation request 126 is not in the configured VPC 118, the activation firewall 130 may determine, at 516, that the licensed application is in the peered VPC 122. At 518, the activation firewall 130 may forward the activation request 126 to an activation server 136 that activates the licensed application 120.

Figure 6:
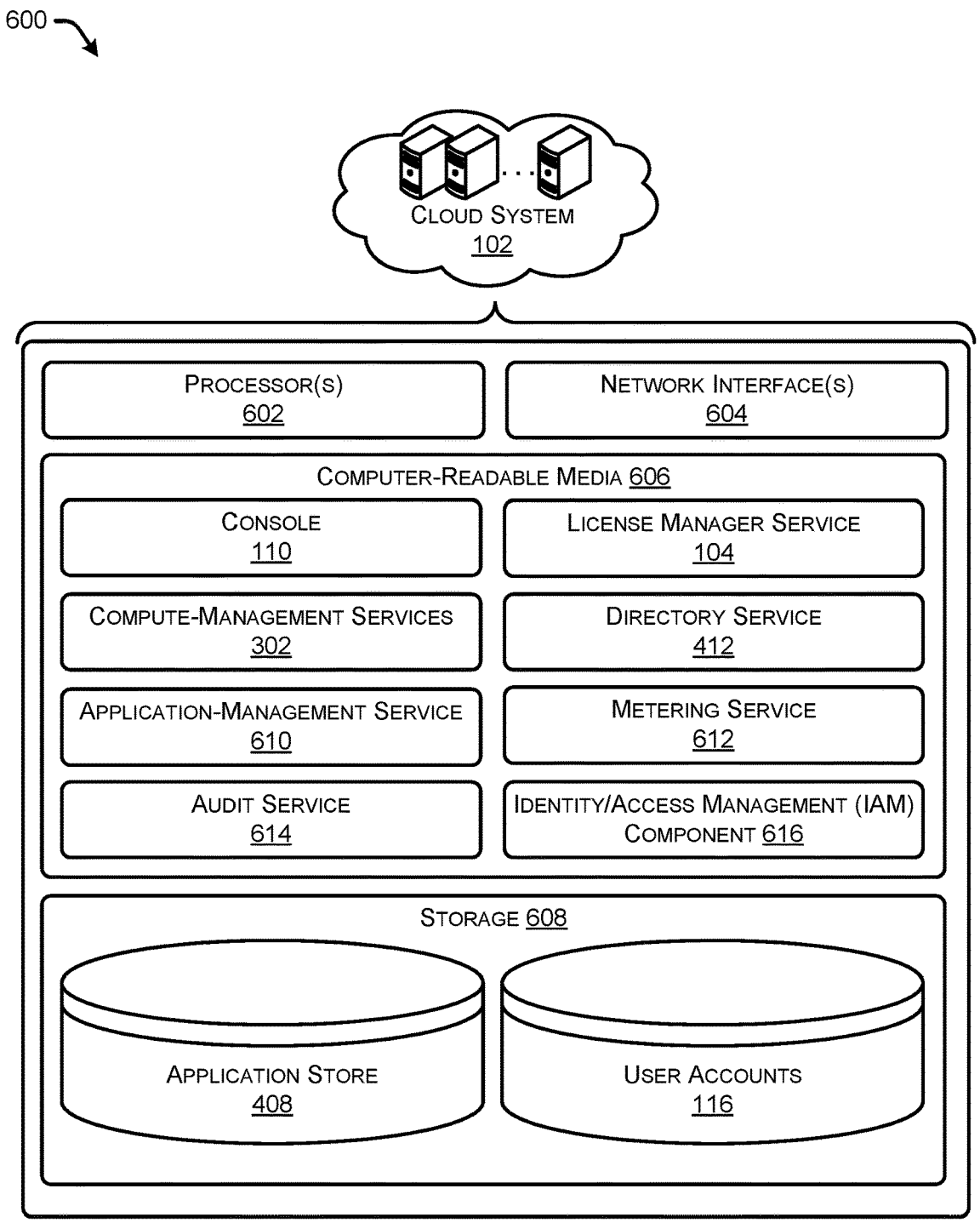
FIG. 6 illustrates a component diagram of example components of a cloud system that performs the techniques described herein.

FIG. 6 illustrates a component diagram 600 of example components of a cloud system 102 that performs the techniques described herein. As illustrated, the cloud system 102 may include one or more hardware processors 602 (processors), one or more devices, configured to execute one or more stored instructions. The processor(s) 602 may comprise one or more cores. Further, the cloud system 102 may include one or more network interfaces 604 configured to provide communications between the cloud system 102 and other devices, such as the user device(s), and/or other systems or devices in the cloud system 102 and/or remote from the cloud system 102. The network interfaces 604 may include devices configured to couple to personal area networks (PANs), wired and wireless local area networks (LANs), wired and wireless wide area networks (WANs), and so forth.

The cloud system 102 may also include computer-readable media 606 that stores various executable components (e.g., software-based components, firmware-based components, etc.). In addition to various components discussed in the previous figures, the computer-readable-media 606 may further store components to implement functionality described herein. While not illustrated, the computer-readable media 606 may store one or more operating systems utilized to control the operation of the one or more devices that comprise the cloud system 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the cloud system 102 may include a data store, or storage 608, which may comprise one, or multiple, repositories or other storage locations for persistently storing and managing collections of data such as databases, simple files, binary, and/or any other data. The storage 608 may include one or more storage locations that may be managed by one or more database management systems.

The computer-readable media 606 may store services, or components, of the cloud system 102 as described herein. Further, the computer-readable media 606 may store an application-management service 610 configured to manage the applications are offered for use in the cloud system 102 (e.g., in the application store 408). Further, the computer-readable media 606 may store and execute a metering service 612 to track the number of instances of an application running for compliance and cost reasons. Additionally, the computer-readable media 606 may store and execute an audit service 614 that audits usage of applications 120 to ensure that users 106 are compliant with rules for using the applications 120 (e.g., identifying untracked application instances and onboarding them).

To utilize the services provided by the cloud system 102, the users 106 may register for accounts 116 with the cloud system 102. For instance, users 106 may utilize a user device to interact with an identity and access management (IAM) component 616 that allows the users 106 to create user accounts 116 with the cloud system 102. Generally, the IAM component 616 may enable the users 106 to manage their network infrastructures remotely, and view analytics provided by the license manager service 104. Generally, the different user accounts 116 can assume different roles, or sets or permissions/credentials, that allow users 106 to perform different actions, and be restricted from performing some actions. In some instances, a same organization may have multiple accounts that have different network infrastructures.

The computer-readable media 606 may be used to store and retrieve information, such as program modules, data structures, or other data. It should be appreciated by those skilled in the art that computer-readable storage media is any available media that provides for the non-transitory storage of data and that can be accessed by the cloud system 102. In some examples, the operations performed by the cloud system 102, and or any components included therein, may be supported by one or more server devices. Stated otherwise, some or all of the operations performed by the cloud system 102, and or any components included therein, may be performed by one or more computer devices operating in a cloud-based arrangement.

By way of example, and not limitation, computer-readable storage media 606 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 7:
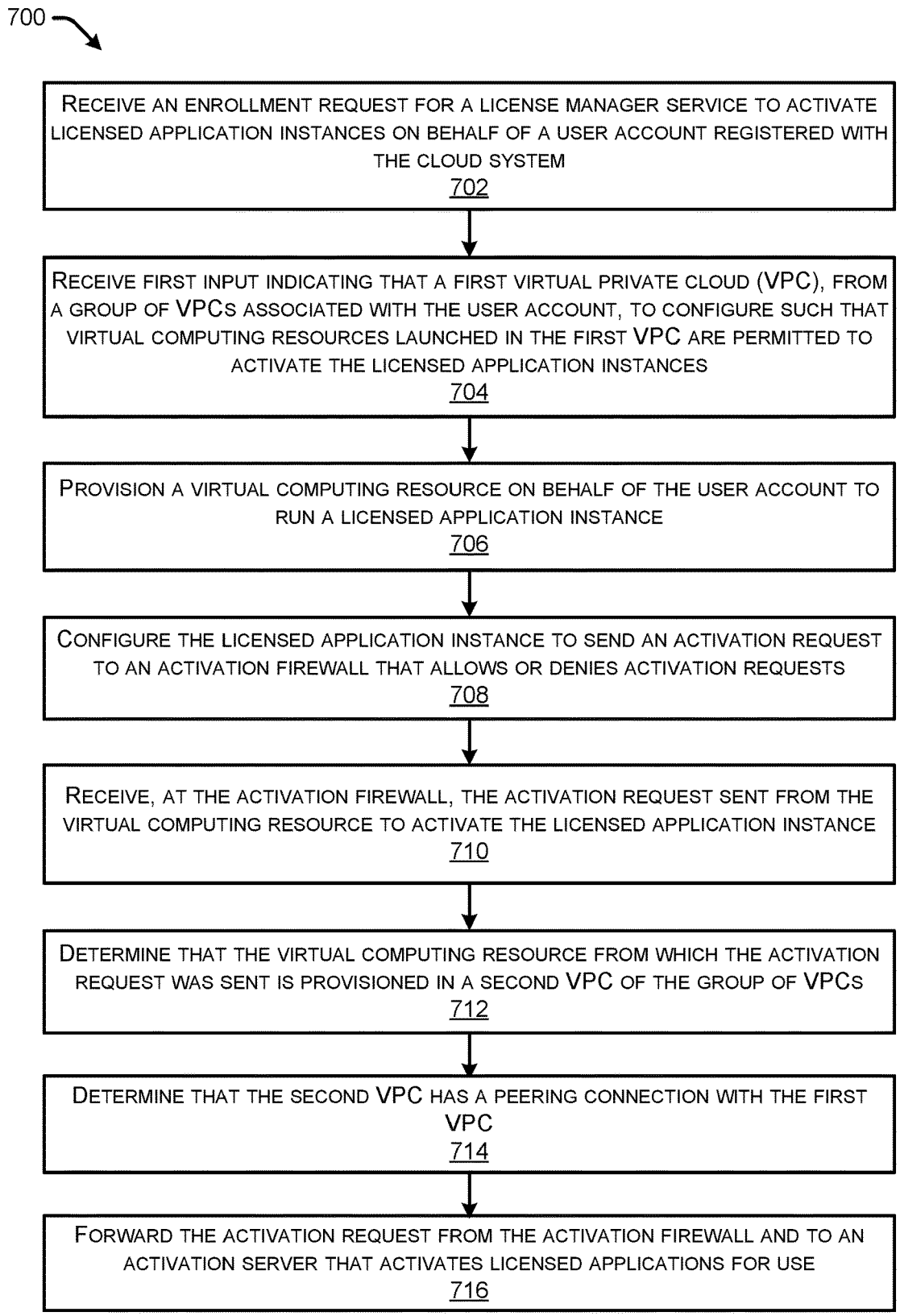
FIG. 7 illustrate a flow diagram of an example process for a license manager service to configure a VPC, determine peered VPCs for the configured VPC, and forward an activation request sent from a licensed application in the peered VPC to an activation server.
Figure 8:
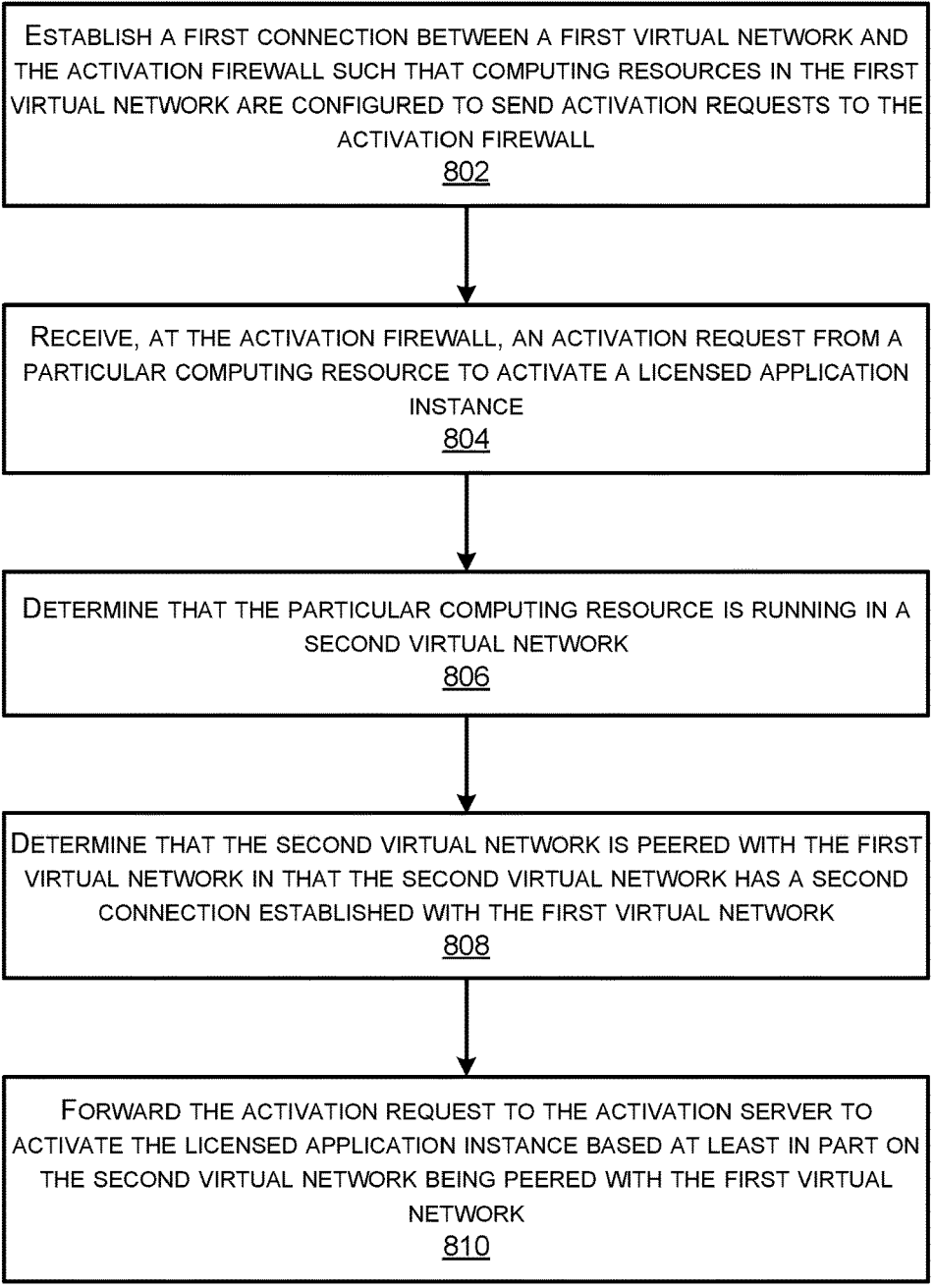
FIG. 8 illustrate a flow diagram of an example process for a license manager service to receive an activation request sent from a licensed application, determine that the licensed application is in a peered VPC of a configured VPC, and forward the activation request to an activation server.
Figure 9:
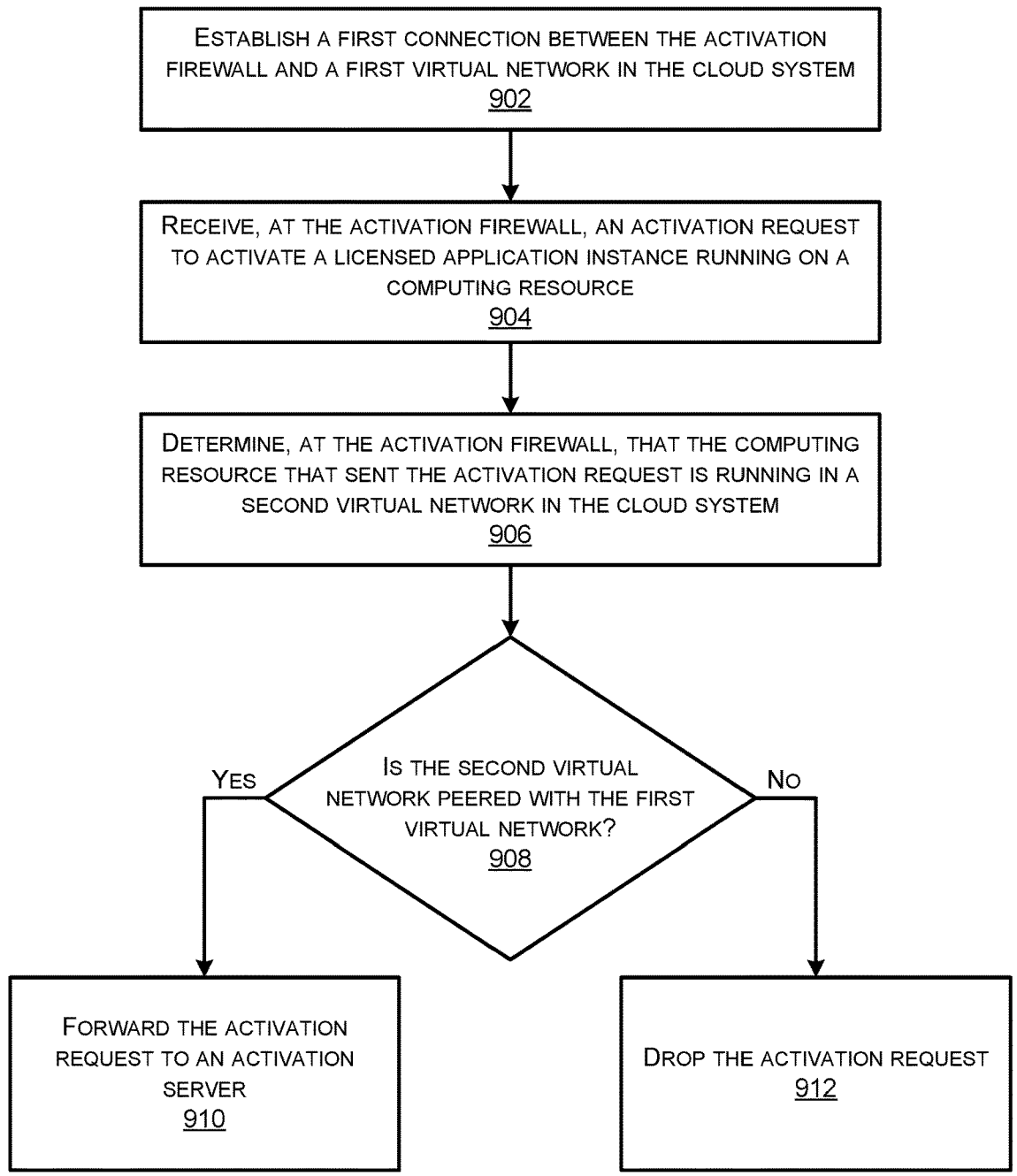
FIG. 9 illustrate a flow diagram of an example process for an activation firewall to filter activation requests from licensed applications.

FIGS. 7-9 illustrate flow diagrams of example methods 700, 800, and 900, that illustrate aspects of the functions performed at least partly by the cloud system 102 as described in this disclosure. The logical operations described herein with respect to FIGS. 7-9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7-9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrate a flow diagram of an example process 700 for a license manager service 104 to configure a VPC, determine peered VPCs for the configured VPC, and forward an activation request sent from a licensed application in the peered VPC to an activation server.

At 702, the license manager service may receive an enrollment request for the license manager to activate licensed application instances on behalf of a user account registered with the cloud system. For instance, a user 106 may submit an enrollment request 114 to the license manager service 104 to active licensed applications 120 on behalf of the user account 116 that is registered with the cloud system 102.

At 704, the license manager service may receive first input indicating that a first virtual private cloud (VPC), from a group of VPCs associated with the user account, to configure such that virtual computing resources launched in the first VPC are permitted to activate the licensed application instances. In some instances, the first input may be received via a VPC field 210 that prompts the user 106 to choose a configured VPC 118 that is to receive additional configuration to enable the license manager service 104.

At 706, the license manager service may provision a virtual computing resource on behalf of the user account to run a licensed application instance. For instance, the compute-management service 302 may provision a virtual computing resource on behalf of the user account 116 to run a licensed application 120 instance.

At 708, the license manager service may configure the licensed application instance to send an activation request to an activation firewall that allows or denies activation requests. In some instances, the licensed application 120 instance my send an activation request 126 in response to receiving a trigger from the license manager service 104, and in other examples, the licensed application 120 instance my send an activation request 126 upon being installed or launched.

At 710, the license manager service 104 may receive, at the activation firewall 130, the activation request 126 sent from the virtual computing resource to activate the licensed application 120 instance.

At 712, the license manager service 104 may determine that the virtual computing resource from which the activation request was sent is provisioned in a second VPC of the group of VPCs. For instance, the activation firewall 130 may extract a tuple from the activation request 126 where the tuple includes a VPC identifier (ID) of the second VPC and a private Internet Protocol (IP) address of the virtual computing resource, and identify the second VPC using the VPC ID.

At 714, a license manager service 104 may determine that the second VPC has a peering connection with the first VPC. For instance, the license manager service 104 may verify, using the tuple and a listing of peered VPCs 122, that the virtual computing resource is provisioned in the second VPC (or peered VPC 122) having the peered connection 124 with the first VPC (or configured VPC 118).

At 716, the license manager service 104 may, based at least in part on the second VPC having the peering connection 124 with the first VPC, forwarding the activation request 126 from the activation firewall 130 and to an activation server 136 that activates licensed applications 120 for use. The activation server 136 may then communicate with the licensed application 120 instance to activate the licensed application.

FIG. 8 illustrate a flow diagram of an example process 800 for a license manager service 104 to receive an activation request 126 sent from a licensed application 120, determine that the licensed application 120 is in a peered VPC 122 of a configured VPC 118, and forward the activation request 126 to an activation server 136.

At 802, the license manager service 104 may establish a first connection between a first virtual network and the activation firewall such that computing resources in the first virtual network are configured to send activation requests to the activation firewall. For instance, a configured VPC 118 may use a VPC endpoint 305 to create a private DNs link 306 to an activation firewall 130. Generally, the first and second virtual networks may be overlay networks that provide isolated portions of a cloud system 102 to different users or customers. Examples of the overlay network may be VPCs, virtual networks (or VNets), and/or other virtual overlay networks.

At 804, the license manager service 104 may receive, at the activation firewall 130, an activation request 126 from a particular computing resource to activate a licensed application 120 instance.

At 806, the license manager service 104 may determine that the particular computing resource is running in a second virtual network. For instance, the activation firewall 130 may extract a tuple from the activation request 126 where the tuple includes a VPC ID of the second VPC and a private IP address of the virtual computing resource, and identify the second VPC using the VPC ID.

At 808, a license manager service may determine that the second virtual network is peered with the first virtual network in that the second virtual network has a second connection established with the first virtual network. For instance, the license manager service 104 may determine that the second virtual network (e.g., peered VPC 122) has a peering connection 124 with the first virtual network (e.g., configured VPC 118).

At 810, the license manager service 104 may, based at least in part on the second virtual network being peered with the first virtual network, forward the activation request 126 to the activation server 136 to activate the licensed application 120 instance. For example, the license manager service 104 may determine, at the activation firewall 136, a unique product code that is assigned to the licensed application instance 120, and identify, using a mapping stored at the activation firewall 130, a private DNS name that is mapped to the unique product code where the private DNS name is associated with the activation server 136. In such examples, the activation request 126 is forwarded to the private DNS name.

FIG. 9 illustrate a flow diagram of an example process 900 for an activation firewall 130 to filter activation requests 126 from licensed applications 120.

At 902, the activation firewall may establish a first connection with a first virtual network in a cloud system. For instance, the activation firewall 130 may establish the private DNS link 306 with the configured VPC 118 in the cloud system 102.

At 904, the activation firewall may receive an activation request to activate a licensed application instance running on a computing resource. For instance, an activation request 126 may be received from a licensed application 120 running in a VPC of a user account 116.

At 906, the activation firewall may determine that the computing resource that sent the activation request is running in a second virtual network in the cloud system. For instance, the activation firewall 130 may extract a tuple from the activation request 126 where the tuple includes a VPC ID of the second virtual network and a private IP address of the computing resource, and identify the second virtual network using the VPC ID.

At 908, the activation firewall may determine whether the second virtual network is peered with the first virtual network. For instance, the activation firewall 130 may determine whether the second virtual network (e.g., second VPC) has a peering connection 124 established with the first virtual network (e.g., first VPC).

At 910, in response to determining that the second virtual network is peered to the first virtual network, the activation firewall 130 may forward the activation request 126 to an activation server. Alternatively, in response to determining that the second virtual network is not peered to the first virtual network, activation firewall 130 may drop the activation request 126 at 912.

Figure 10:
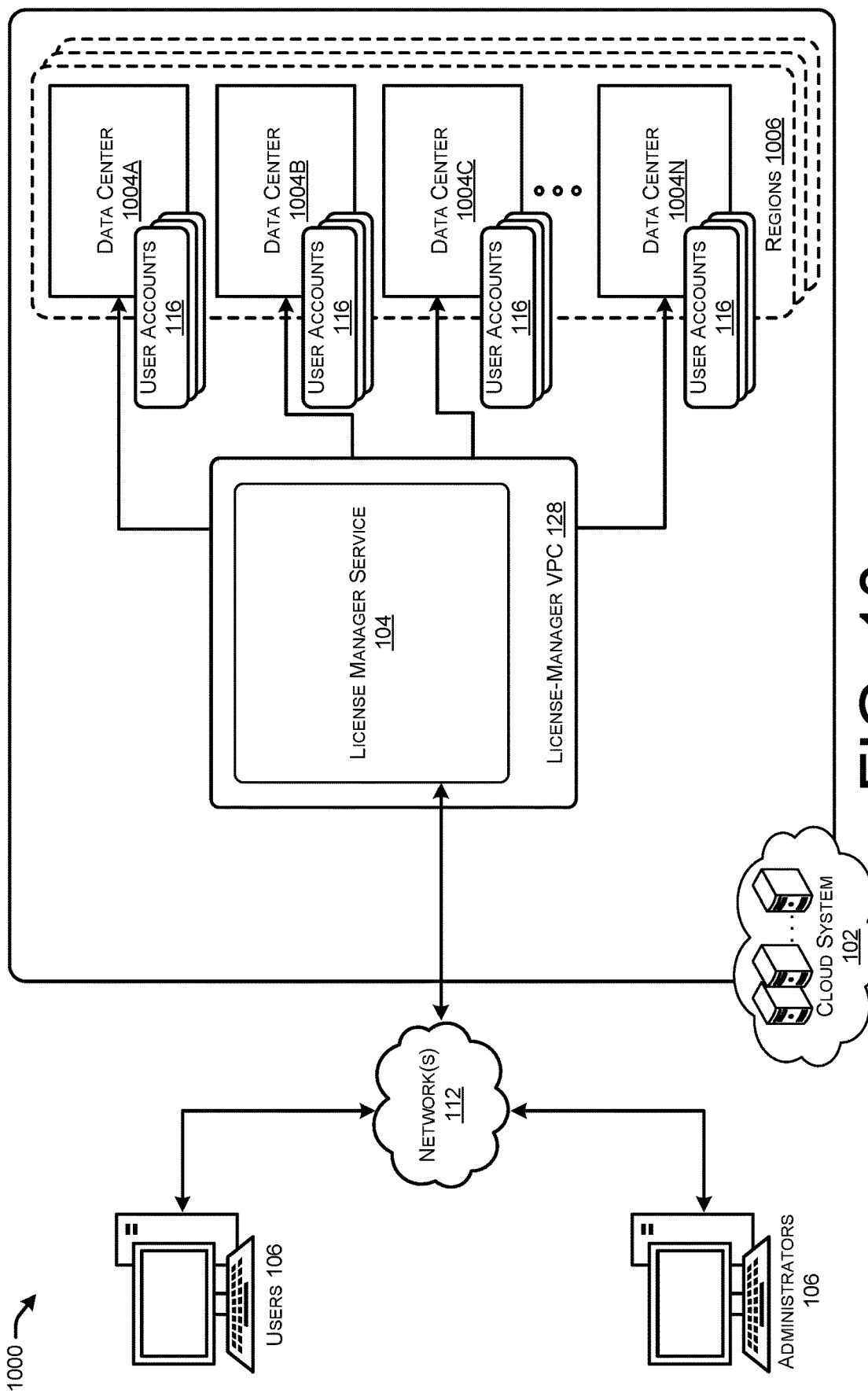
FIG. 10 is a system and network diagram that shows an illustrative operating environment that includes data centers of a cloud system that can be configured to implement aspects of the functionality described herein.

FIG. 10 is a system and network diagram 1000 that shows an illustrative operating environment that includes data centers 1004 in one or more regions 1006 of a cloud system 102 that can be configured to implement aspects of the functionality described herein. The cloud system 102 can provide computing resources, like VM instances and storage, on a permanent or an as-needed basis. Among other types of functionality, the computing resources provided by the cloud system 102 may be utilized to implement the various services described above. As also discussed above, the computing resources provided by the cloud system 102 can include various types of computing resources, such as data processing resources like VM instances, data storage resources, networking resources, data communication resources, network services, and the like.

Each type of computing resource provided by the cloud system 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The cloud system 102 can also be configured to provide other types of computing resources not mentioned specifically herein.

The computing resources provided by the cloud system 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The users 106, such as administrators 106, of the user devices 108 that utilize the cloud system 102 may access the computing resources provided by the cloud system 102 over any wired and/or wireless network(s) 112, which can be a wide area communication network ("WAN"), such as the Internet, an intranet or an Internet service provider ("ISP") network or a combination of such networks. For example, and without limitation, a user device operated by a user 106 of the cloud system 102 may be utilized to access the cloud system 102 by way of the network(s) 112. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
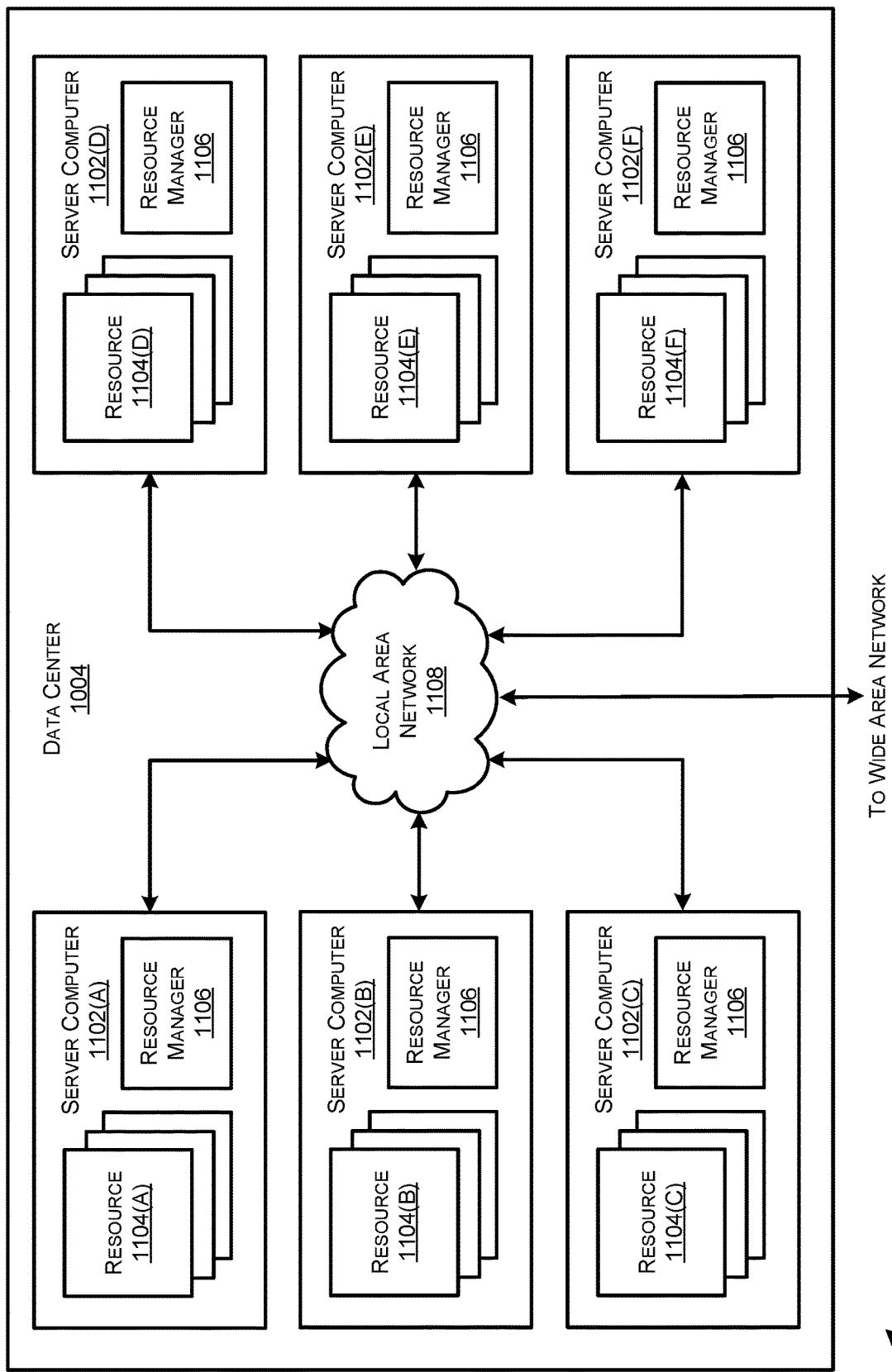
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices described herein.

The server computers 1102 can be standard tower, rackmount, or blade server computers configured appropriately for providing the computing resources described herein (illustrated in FIG. 11 as the computing resources 1104A-1104E). As mentioned above, the computing resources provided by the cloud system 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

Figure 12:
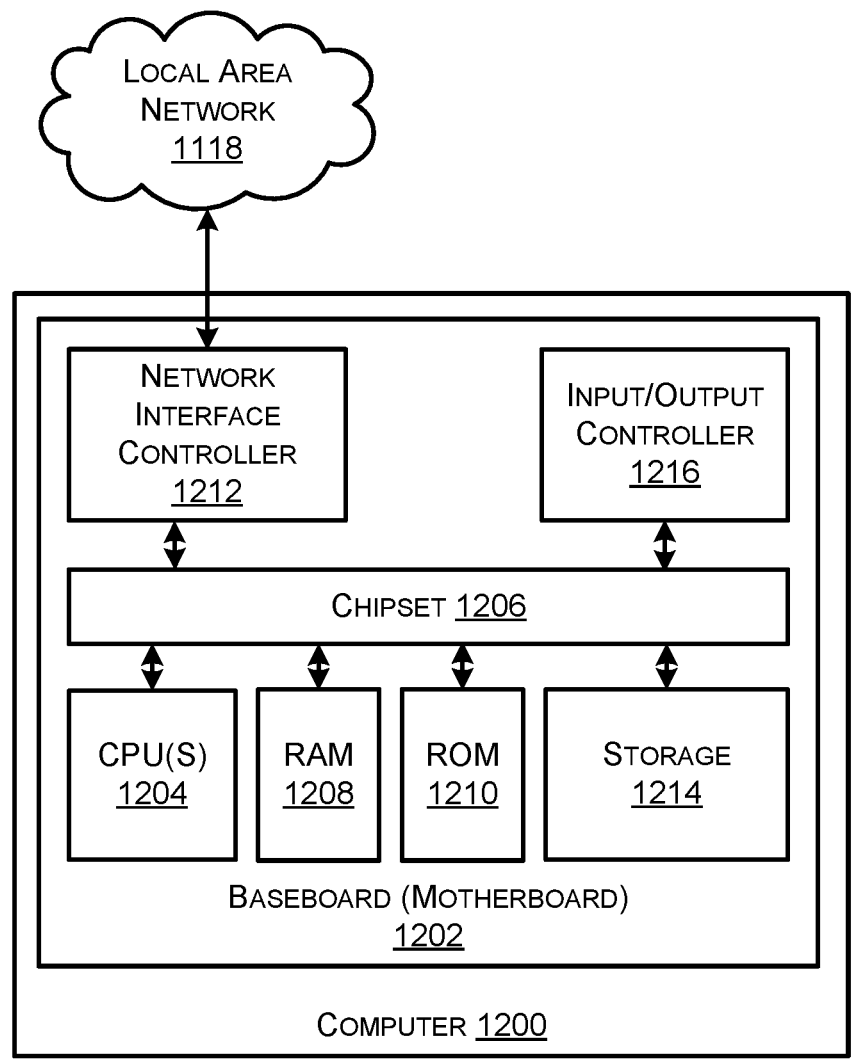
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 112. The chipset 1206 can include functionality for providing network connectivity through a network interface controller (NIC) 1212, such as a gigabit Ethernet adapter. The NIC 1212 is capable of connecting the computer 1200 to other computing devices over the local area network 1118 (or 112). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the cloud system 102, and or any components included therein, may be supported by one or more devices similar to computer 1200. Stated otherwise, some or all of the operations performed by the cloud system 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a license manager service of a cloud system to activate licensed applications that are running in the cloud system, the method comprising:
   receiving an enrollment request for the license manager service to activate licensed application instances on behalf of a user account registered with the cloud system;
   receiving first input indicating that a first virtual private cloud (VPC), from a group of VPCs associated with the user account, to configure such that virtual computing resources launched in the first VPC are permitted to activate the licensed application instances;
   provisioning a virtual computing resource on behalf of the user account to run a licensed application instance;
   configuring the licensed application instance to send an activation request to an activation firewall that allows or denies activation requests;
   receiving, at the activation firewall, the activation request sent from the virtual computing resource to activate the licensed application instance;
   determining that the virtual computing resource from which the activation request was sent is provisioned in a second VPC of the group of VPCs;
   determining that the second VPC has a peering connection with the first VPC; and
   based at least in part on the second VPC having the peering connection with the first VPC, forwarding the activation request from the activation firewall and to an activation server that activates licensed applications for use.

2. The method of claim 1, further comprising:
   receiving consent to create a set of permissions in the user account that allows the license manager service to perform various operations; and
   using the set of permissions, obtaining a listing of peered VPCs that have respective peering connections with the first VPC,
   wherein determining that the second VPC has the peering connection with the first VPC includes identifying the second VPC from the listing of peered VPCs.

3. The method of claim 1, further comprising:
   receiving a listing of peered VPCs that have respective peering connections with the first VPC;
   extracting, by the activation firewall, a tuple from the activation request, the tuple including a VPC identifier (ID) of the second VPC and a private Internet Protocol (IP) address of the virtual computing resource; and
   verifying, using the tuple and the listing of peered VPCs, that the virtual computing resource is provisioned in the second VPC having the peered connection with the first VPC.

4. The method of claim 1, further comprising:
   provisioning the activation firewall and the activation server in an activation virtual private cloud (VPC) of the cloud system;
   providing a VPC endpoint service associated with the activation VPC that accepts activation request on behalf of the activation firewall;
   establishing a private connection between the VPC endpoint service and a user VPC endpoint associated with the first VPC,
   wherein the activation request is sent from the second VPC to the activation firewall via the peering connection and the private connection.

5. A cloud system that runs a license manager service, the cloud system comprising:
   an activation server that activates licensed applications;
   an activation firewall that allows or denies activation requests from being sent to the activation server;
   one or more processors; and
   one or more computer-readable media storing computer-executable instructions that, when executed by the one or more processors, cause the license manager service to perform operations comprising:
      establishing a first connection between a first virtual network and the activation firewall such that computing resources in the first virtual network are configured to send activation requests to the activation firewall;
      receiving, at the activation firewall, an activation request from a particular computing resource to activate a licensed application instance;
      determining that the particular computing resource is running in a second virtual network;
      determining that the second virtual network is peered with the first virtual network in that the second virtual network has a second connection established with the first virtual network; and
      based at least in part on the second virtual network being peered with the first virtual network, forwarding the activation request to the activation server to activate the licensed application instance.

6. The cloud system of claim 5, wherein the activation request is sent from the second virtual network to the first virtual network via the second connection and from the first virtual network to the activation server via the first connection, the operations further comprising:
receiving, at the licensed application instance and via the first and second connection, an activation response sent from the activation server that activates the licensed application instance.

7. The cloud system of claim 5, the operations further comprising:
creating a set of permissions in a user account associated with the first virtual network that allows the license manager service to perform various operations; and
using the set of permissions, obtaining a listing of peered virtual networks that have respective peering connections with the first virtual network,
wherein determining that the second virtual network is peered with the first virtual network includes identifying the second virtual network from the listing of peered virtual networks.

8. The cloud system of claim 5, the operations further comprising:
extracting, by the activation firewall, metadata from the activation request, wherein the metadata includes:
an Internet Protocol (IP) address associated with particular computing resource; and
a network ID of the second virtual network in which the particular computing resource is running;
verifying, using the metadata, that the particular computing resource is running in the second virtual network that is peered with the first virtual network.

9. The cloud system of claim 5, the operations further comprising:
receiving an enrollment request for the license manager service to activate licensed application instances on behalf of a user account registered with the cloud system;
prompting the user account for permission to create a set of permissions in the user account that allows the license manager service to perform operations;
receiving approval from the user account to create the set of permissions; and
creating the set of permissions in the user account associated with the first virtual network that allows the license manager service to perform the operations.

10. The cloud system of claim 5, wherein the first and second virtual networks are associated with a user account, the operations further comprising:
identifying, from the activation request, an Internet Protocol (IP) address associated with particular computing resource from the activation request:
determining that the IP address is also assigned to another computing resource in a third virtual network;
extracting, from the activation request, an identifier associated with at least one of the particular computing resource or the licensed application instance; and
verifying, using the identifier, that the particular computing resource is running in the second virtual network that is peered with the first virtual network.

11. The cloud system of claim 5, the operations further comprising:
provisioning the activation firewall and the activation server in a third virtual network of the cloud system;
provisioning a first endpoint in the first virtual network; and
providing a second endpoint associated with the third virtual network that accepts activation request on behalf of the activation firewall;
wherein the first connection is established using the first and second endpoints.

12. The cloud system of claim 5, wherein the activation firewall is a containerized service with a plurality of firewall instances that each filter activation requests, the operations further comprising:
a network load balancer that receives and distributes the activation requests amongst the plurality of firewall instances.

13. The cloud system of claim 12, the operations further comprising:
determining, at the network load balancer, connection information associated with a connection used by the virtual computing instance to send the activation request; and
prepending, using a proxy protocol, the connection information in a packer header associated with the activation request such that the connection information is communicated to the activation server along with the activation request.

14. The cloud system of claim 5, the operations further comprising:
determining, at the activation firewall, a unique product code that is assigned to the licensed application instance; and
identifying, using a mapping stored at the activation firewall, a private Domain Name System (DNS) name that is mapped to the unique product code, the private DNS name being associated with the activation server,
wherein the activation request is forwarded to the private DNS name.

15. A method performed at least partly by an activation firewall in a cloud system, comprising:
establishing a first connection between the activation firewall and a first virtual network in the cloud system;
receiving, at the activation firewall, an activation request to activate a licensed application instance running on a computing resource;
determining, at the activation firewall, that the computing resource that sent the activation request is running in a second virtual network in the cloud system;
determining whether the second virtual network is peered with the first virtual network; and
in response to determining that the second virtual network is peered to the first virtual network, forwarding the activation request to an activation server; or
in response to determining that the second virtual network is not peered to the first virtual network, dropping the activation request.

16. The method of claim 15, wherein the activation request is sent from the second virtual network to the first virtual network via a second connection and from the first virtual network to the activation server via the first connection, further comprising:
determining that the second virtual network is peered to the first virtual network;
forwarding the activation request to an activation server; and
receiving, at the licensed application instance and via the first and second connection, an activation response sent from the activation server that activates the licensed application instance.

17. The method of claim 15, further comprising:
extracting, by the activation firewall, metadata from the activation request, wherein the metadata includes:
an Internet Protocol (IP) address associated with particular computing resource; and
a network ID of the second virtual network in which the particular computing resource is running;
verifying, using the metadata, that the particular computing resource is running in the second virtual network that is peered with the first virtual network.

18. The method of claim 17, wherein the activation firewall is a containerized service with a plurality of firewall instances that each filter activation requests, further comprising:
receiving, from a network load balancer, the activation requests amongst the plurality of firewall instances; and
allowing or disallowing the activation requests by the plurality of firewall instances.

19. The method of claim 15, wherein the first and second virtual networks are associated with a user account, further comprising:
identifying, from the activation request, an Internet Protocol (IP) address associated with particular computing resource from the activation request:
determining that the IP address is also assigned to another computing resource in a third virtual network;
extracting, from the activation request, an identifier associated with at least one of the particular computing resource or the licensed application instance; and
verifying, using the identifier, that the particular computing resource is running in the second virtual network that is peered with the first virtual network.

20. The method of claim 15, further comprising:
determining, at the activation firewall, a unique product code that is assigned to the licensed application instance; and
identifying, using a mapping stored at the activation firewall, a private Domain Name System (DNS) name that is mapped to the unique product code, the private DNS name being associated with the activation server,
wherein the activation request is forwarded to the private DNS name.

* * * * *